United States Patent [19]

McMahon et al.

[11] Patent Number: 4,636,636

[45] Date of Patent: Jan. 13, 1987

[54] MICROWATT BATTERY POWERED OPTICAL SENSOR

[75] Inventors: Donald H. McMahon, Carlisle; Richard A. Soref, Newton Centre, both of Mass.

[73] Assignee: Sperry Corporation, New York, N.Y.

[21] Appl. No.: 630,568

[22] Filed: Jul. 13, 1984

[51] Int. Cl.⁴ ............................................. G02F 1/00
[52] U.S. Cl. ..................................... 250/227; 455/614
[58] Field of Search ............... 250/551, 231 R, 227; 310/337, 322, 318; 367/180, 140, 157, 149, 850; 340/626, 531, 850, 854; 455/614

[56] References Cited

U.S. PATENT DOCUMENTS

| | | | |
|---|---|---|---|
| 3,610,938 | 10/1971 | Cook et al. | 250/551 |
| 3,903,497 | 9/1975 | Stimler et al. | 455/614 |
| 4,247,790 | 1/1981 | Sahasrabudhe et al. | 250/551 |
| 4,417,140 | 11/1983 | Adolfsson et al. | 250/231 R |

*Primary Examiner*—David C. Nelms
*Assistant Examiner*—Stephone Allen
*Attorney, Agent, or Firm*—Howard P. Terry

[57] ABSTRACT

A battery powered optical sensor, capable of functioning for a period of time approximately equal to the shelf life of the battery, utilizes an LED driven by an optical transducer and biased by the battery at a level that exceeds the shot noise level of the LED by the dynamic range of the sensor.

6 Claims, 3 Drawing Figures

MICROWATT BATTERY POWERED OPTICAL SENSOR

BACKGROUND OF THE INVENTION

1. Field of the Invention

The present invention relates to optical sensor systems and more specifically to battery powered fiber optic sensor system.

2. Description of the Prior Art

Optical sensor systems, in which a sensed condition such as temperature, pressure, acceleration or sound is converted to an optical signal for transmission to a remote utilization apparatus are well known in the art.

These systems frequently employ a transducer such as a piezoelectric element, to convert a sensed condition, such as a pressure variation to an electrical signal that actuates a variable light source. The output of the light source is then coupled into a fiber optic element which transmits the light energy to a remote measuring position.

Such fiber optic systems frequently employ either single mode interferometric techniques or multimode intensity modulated techniques. In the latter case, light is transmitted to and from the sensor location and the sensor acts merely to modulate the returned light signal in accordance with the condition being monitored.

In terms of reliability and cost, there is frequently great value attached to the use of such electrically passive fiber optic sensors.

In many applications, however, complete electrical sensor passivity is less important than overall power minimization with respect to the entire fiber optic sensor system. For such systems, transmitting optical power to the sensor for optical modulation and for ultimate conversion of the modulated signal to electrical power for running electronic components is less efficient than incorporating a battery into the sensor circuit.

In such prior art devices, the fiber optic sensors typically operate at relatively high optical power levels so as to minimize optical shot noise with respect to the smallest possible change in optical throughput caused by the sensor. The shot noise may be expressed as:

$$\left.\frac{\Delta I}{I}\right|_{shot} = 8 \times 10^{-10} \left(\frac{B}{I}\right)^{\frac{1}{2}} \quad (1)$$

where $\Delta I/I$ is the minimum fractional optical signal change that is just detectable, I is the optical power level reaching the light detector in Watts, and B is the detection bandwidth in Hertz.

Thus, adopting the convention that an exponential term $A10^{-M}$ may be written $AE-M$, and assuming that $I=100\ \mu W$, and $B=1$ Hz, one can just detect a change in signal of $\Delta I = 8E-10 \times 1E-2 = 8E-b\ 12$ Watts.

Assuming the sensor is mechanically constructed to maximize the optical throughput change for a given change in monitored condition, further increases in sensitivity (in view of the shot noise limit) can be achieved only by increasing the optical signal power reaching the detector.

Thus in the prior art devices, there is an apparent conflict between the goal of maximizing sensitivity and minimizing the electrical power supplied to drive the light source. The resolution of this conflict is an object of the present invention.

SUMMARY OF THE INVENTION

A battery powered fiber optic sensor capable of functioning for a time period approximately equal to the shelf life of the battery includes a transducer for converting the signal to be monitored into an electrical signal, an electrically biased LED which provides optical signals representative of the electrical signal to a optical transmission line for propagation to an optical detector whereat the received optical signal is converted to an electrical signal. The electrical bias on the LED causes the emission of an optical signal from the LED at an intensity level that, when received by the optical detector, establishes a bias level thereat which exceeds the shot noise level of the optical detector only by its dynamic range.

DESCRIPTION OF THE PREFERRED EMBODIMENT

Figure 1:
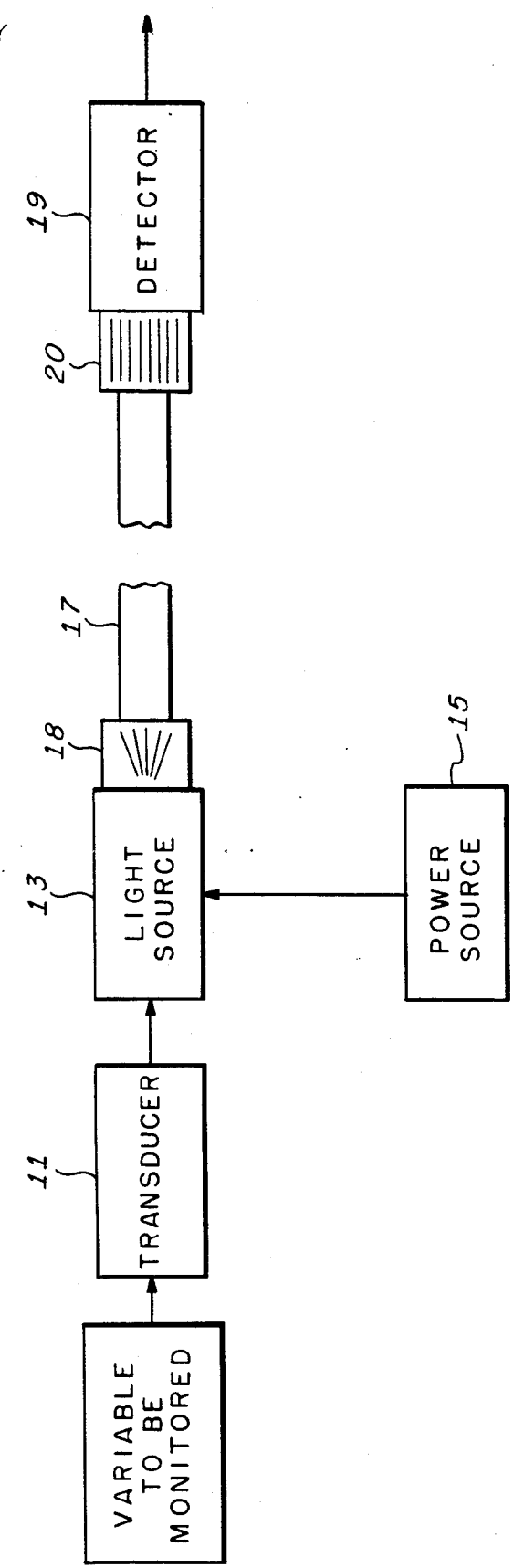
FIG. 1 is a block diagram illustrating the general configuration of a device employing the principles of the invention.

FIG. 1 illustrates the general configuration of optical sensor systems to which the principles of the invention may be applied.

In such systems, a suitable transducer 11 is arranged to respond to the variable to be monitored. Typically, the variable may be pressure, acceleration, velocity, air or hydrostatic pressure or the like. Transducers for converting these variables to an electric signal are well known in the art. For instance, many types of variables may be detected by a piezoelectric crystal and converted into electrical signals. The output of the transducer actuates a variable light source 13 which is energized from a power source 15. The output of the light source 13 is injected into an optical fiber transmission element 17 for transmission to a remote detector 19.

The light from the source 13 may be injected into the fiber transmission line 17 through a known type of coupling element such as a Grinrod lens 18. Similarly light emerging from the transmission line 17 may be coupled to the detector 19 through a coupling element 20.

The present invention is concerned with minimizing the electrical power consumption of a fiber optic sensor to the point where the sensor is capable of functioning for a time period comparable to the shelf life of a small battery.

The various components necessary to construct an optical sensor embodying the principles of the present invention are commercially available. In order to understand the parameters under which these components must operate, it is helpful to first calculate the minimum amount of optical power that must be available to communicate sensor information through a fiber optic link to the remote location at which the detector is available.

Assume that the detector element is designed to reliably measure signals whose strength varies throughout a dynamic range of 100 dB. Since $I_2/I_1 = 1E-10$, it is readily determined from equation 1 that $\Delta I_2/\Delta I_1 = -$ 1E−5. If I₂ is the bias power level on LED above the shot noise level and is set equal to $\Delta I_1$, the minimum fractional optical signal change detectable is $\Delta I/I$=-1E−5. For purposes of illustration, assume a detector bandwidth of 1 Hz. Then, from equation 1, the optical signal strength reaching the detector must be:

$$I=(6.4E-19)B/(\Delta I/I)^2=(6.4E-9) \text{ Watts} \qquad (2)$$

Assume negligible optical losses in the fiber link, the sensor light source must be capable of injecting only nanowatts of optical power into the fiber.

Consider now, the light source 13. As presently preferred, commercially available light emitting diode (LED) sources that have recently become available in which the electrical-to-optical conversion efficiency is substantially a linear function of drive current, falling off gradually and substantially linearly as the drive current is reduced, may be used as an efficient electrical-to-optical conversion means. This characteristic is opposed to prior types of solid state light sources wherein the conversion efficiency decays exponentially as the drive current is reduced below a knee value. More rapid than linear fall off in light output with electrical drive power may be due to a variety of factors, including surface electron or hole recombination caused by improper surface passivation.

In general, the LED of the present invention is biased so that the light power level is reduced to that level which is above the shot noise level only by a factor equal to the dynamic range of the sensor.

Measurements on a Hitachi HLP-60 LED, for instance, which normally operates at a level of 200 mA, revealed that this diode converts 18% of the electrical power input to light at 100 mA drive current. At 1 μA drive current, the efficiency was still about 2%. Furthermore, because of the forward biased diode characteristics of LEDs, the drive voltage is essentially independent of drive current. The aforementioned measurements revealed that with the HLP-60 LED, 8 μA of current was sufficient to inject 6.4 nW of optical power into a 200 μm core optical fiber, and at this current level, the electrical power dissipation of the LED is only 1E−5 Watts.

In order to understand the nature of the present invention consider a particular environment in which the invention may be used, namely a hydrophone for detecting sounds being transmitted through seawater.

Typically, a hydrophone may employ a piezoelectric element which produces a voltage indicative of the sound wave impinging on the element.

The sea state zero noise level typically is in the order of 1E−4 newton/m² at 1 kHz, and a state of the art hydrophone using a piezoelectric element may produce a voltage of 3E−8 volts in response to this noise level.

Since the LED which is to be actuated by the output voltage of the piezoelectric element operates as a current sink in that large variations of current are required with virtually no change in drive voltage, and the piezoelectric element is a high resistance voltage source, a voltage-to-current transimpedence amplifier must be inserted between the transducer and the LED. Thus if the LED is to be operated at a 8 μA, the voltage of 3E−8 volts produced by the piezoelectric element must be transformed to a current change of 8E−8 Amps.

Figure 2:
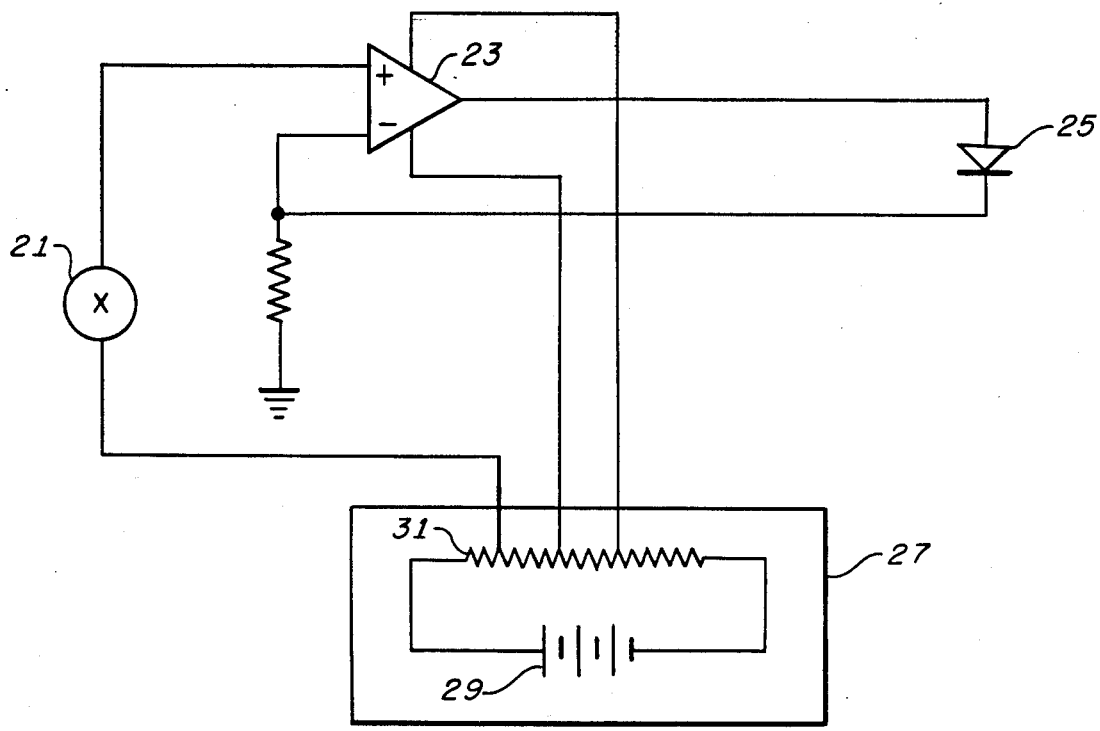
FIG. 2 is a diagram illustrating a typical circuit for actuating a light source in accordance with the principles of the invention.

As presently preferred to low power CMOS operational amplifier such as the Intersil 1CL761X series may be used to provide this transformation as illustrated in FIG. 2, where the output voltage of the transducer 21 is applied to the transimpedence amplifier 23, and the output of the amplifier is used to drive the LED 25. Energy for the LED and amplifier is derived in a straight forward manner from a source 27 which includes a battery 29 and voltage divider 31. It will be understood that light emanating from the source 25 is coupled into the fiber optic transmission line 17 as previously discussed with respect to FIG. 1.

Figure 3:
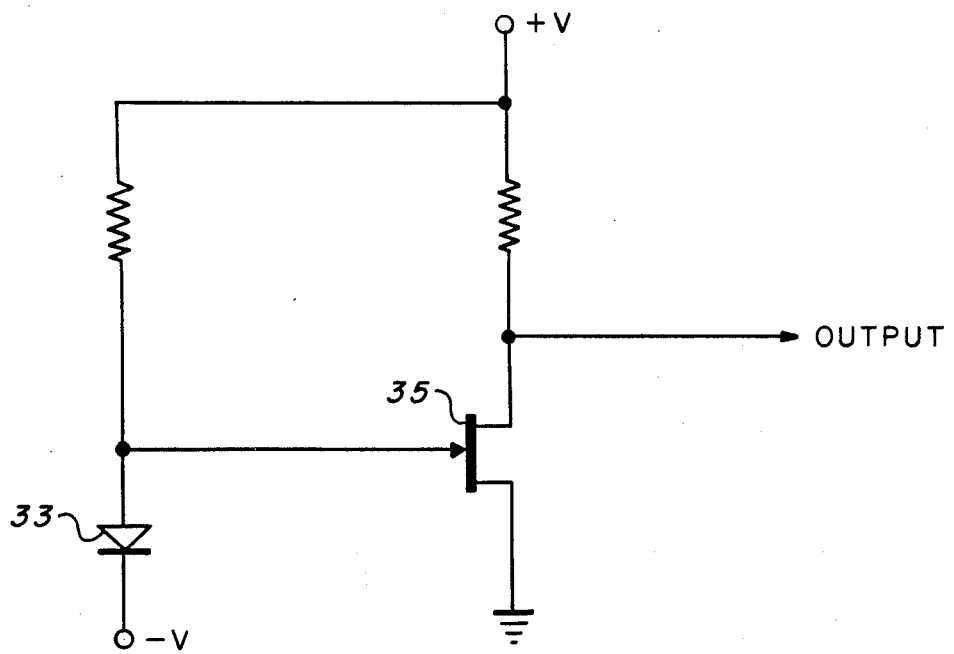
FIG. 3 is a diagram illustrating a detector circuit that may be used in practicing the invention.

FIG. 3 illustrates a typical detector circuit for use in the sensor system. As presently preferred, an optical detecting means such as a PIN diode 33 is coupled to the fiber transmission line 17 through a coupling means such as a Grinrod lens as previously discussed with respect to FIG. 1. The output of the diode is amplified in a straightforward manner in an amplifying means 35 so as to produce an output voltage for use in an external indicating means.

In a particular sensor system employing the principles of the invention, an EGG UVO40 PIN diode was used to detect the light emanating from the fiber transmission line, and a low noise JFET 2N6550 transistor was used as the amplifier 35. The transistor was operated at a current level of 50 μA. The output signal ranged between 1E−6 and 1E−1 volts so that further amplification could be achieved if so desired.

From the foregoing, it can be seen that there are a number of contributing factors which make possible the construction of a fiber optic sensor system that requires only a few microwatts of electrical power. The first of these factors is that the LED to be used is of a type whose electrical to optical conversion efficiency decays substantially linearly rather than exponentially with drive current. The second factor to be considered is that as a result of this characteristic, the power requirements of the LED vary inversely with drive current. Because of these two factors, the LED can inject a useful amount of light energy into the fiber even though the LED is powered at a microwatt level. A third factor to be considered is that with sensors that produce electrical energy, the presence of an electrical gain device permits the light source to be fully modulated for the highest level input signal to be accommodated. This permits the power level to be reduced to a level which is above the shot noise level by a factor only equal to the dynamic range of the sensor. These factors combined with the commercial availability of operational amplifiers that operate with drain currents substantially below 1 mA so as to permit the construction of a fiber optic sensor that consumes so little power that the device can remain operational for the shelf life of a small drive battery.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An optical sensor system comprising:
   transducer means for converting vairables for measurement to electrical signals;
   transmission line means for optical signal propagation therealong;
   detector means, having an optical intensity dynamic range and an optical shot noise intensity level, coupled to one end of said transmission line means for receiving and detecting optical signals; and conversion means coupled between said transducer means and an end opposite said one end of said transmission line means for converting electrical signals from said transudcer means to optical signals for propagation along said transmission line means to said detector means, said conversion means operated about a bias level which establishes at said detector means an optical signal bias that is at an intensity level which exceeds said optical shot noise intensity level by said optical intensity dynamic range.

2. The sensor system of claim 1 wherein said conversion means is a solid state light source.

3. The sensor system of claim 2 wherein said solid state light source is a light emitting diode (LED).

4. The sensor system of claim 1 wherein said variables for measurement are mechanical forces and said transducer means are piezoelectric elements.

5. The sensor system of claim 4 further including operational amplifier means coupled between said piezoelectric elements and said detector means.

6. The sensor system of claim 1 further including battery-power means coupled for operating said conversion means about said bias level.

* * * * *